(12) United States Patent
Galjour

(10) Patent No.: US 11,297,949 B1
(45) Date of Patent: Apr. 12, 2022

(54) SYSTEM FOR JOINING COMPONENTS OF MODULAR FURNITURE

(71) Applicant: Benjamin Andrew Galjour, Tupelo, MS (US)

(72) Inventor: Benjamin Andrew Galjour, Tupelo, MS (US)

( * ) Notice: Subject to any disclaimer, the term of this patent is extended or adjusted under 35 U.S.C. 154(b) by 0 days.

(21) Appl. No.: 16/985,994

(22) Filed: Aug. 5, 2020

(51) Int. Cl.
| | |
|---|---|
| *A47C 1/124* | (2006.01) |
| *A47C 4/02* | (2006.01) |
| *A47C 13/00* | (2006.01) |
| *F16B 2/06* | (2006.01) |
| *A47C 17/04* | (2006.01) |
| *A47C 23/00* | (2006.01) |

(52) U.S. Cl.
CPC ............. *A47C 4/021* (2013.01); *A47C 4/028* (2013.01); *A47C 17/04* (2013.01); *A47C 23/005* (2013.01); *F16B 2/06* (2013.01)

(58) Field of Classification Search
CPC ......... A47C 4/021; A47C 4/028; A47C 17/04; A47C 23/005
USPC ....... 297/248, 411.44, 440.1, 440.14, 440.15
See application file for complete search history.

(56) References Cited

U.S. PATENT DOCUMENTS

| | | | | |
|---|---|---|---|---|
| 2,087,574 A | * | 7/1937 | Kaufer ................... | A47C 17/34 297/248 X |
| 2,793,685 A | * | 5/1957 | Spitz ...................... | A47C 17/34 297/248 X |
| 2,829,707 A | * | 4/1958 | Liebson ................. | A47C 4/028 297/440.1 X |
| 3,030,146 A | * | 4/1962 | Faxon ..................... | A47C 4/02 297/440.1 X |
| 3,183,036 A | * | 5/1965 | Hill ........................ | A47C 4/028 297/440.1 X |
| 3,669,494 A | * | 6/1972 | Lohmeyer ............ | A47C 13/005 297/440.14 |
| 3,669,495 A | * | 6/1972 | Von Rudgisch ......... | A47C 4/02 297/440.15 X |
| 3,973,800 A | * | 8/1976 | Kogan ................. | A47C 13/005 297/248 X |
| 4,067,073 A | * | 1/1978 | Komarov ............... | A47C 4/028 297/440.1 X |
| 4,077,517 A | * | 3/1978 | Hilemn .................... | A47C 4/02 297/440.1 X |
| 4,077,666 A | * | 3/1978 | Heumann ............ | A47C 13/005 297/248 |

(Continued)

FOREIGN PATENT DOCUMENTS

| | | | | |
|---|---|---|---|---|
| GB | 727542 A | * | 4/1955 | ............... A47C 4/02 |
| GB | 756675 A | * | 9/1956 | ............. A47C 4/028 |

*Primary Examiner* — Rodney B White
(74) *Attorney, Agent, or Firm* — George L Williamson

(57) ABSTRACT

Method and apparatus for joining the individual pieces of modular furniture together which includes a plurality of fastening devices that align and strengthen the frame of the furniture by tightly joining abutting pieces of the modular furniture assembly together. Also included is an elongated bar which passes through the individual pieces of the back boxes forming the back of the furniture so as to align and strengthen the abutting pieces of the back boxes of the modular furniture assembly. Additionally, a plurality of spool-like devices are placed at strategic locations on the lower edges of the frame of abutting pieces of the modular furniture assembly so as to strengthen and align the frame pieces on their bottom edges.

20 Claims, 2 Drawing Sheets

(56) References Cited

U.S. PATENT DOCUMENTS

| | | | | |
|---|---|---|---|---|
| 4,668,011 A * | 5/1987 | Fister, Jr. | ............... | A47C 31/11 |
| | | | | 297/248 X |
| 5,314,234 A * | 5/1994 | England | ............... | A47C 13/005 |
| | | | | 297/248 |
| 5,352,017 A * | 10/1994 | Berning | ............... | A47C 13/005 |
| | | | | 297/248 |
| 5,520,437 A * | 5/1996 | LaPointe | ............... | A47C 13/005 |
| | | | | 297/248 X |
| 5,857,742 A * | 1/1999 | Karl | ............... | A47C 1/124 |
| | | | | 297/248 |
| 6,543,845 B2 * | 4/2003 | Seitz | ............... | A47C 1/124 |
| | | | | 297/248 X |
| 6,688,699 B1 * | 2/2004 | Bowie | ............... | A47C 4/021 |
| | | | | 297/440.14 X |
| 6,783,182 B1 * | 8/2004 | Gallagher | ............... | A47C 4/02 |
| | | | | 297/440.14 |
| 6,942,298 B2 * | 9/2005 | Harrison | ............... | A47C 4/02 |
| | | | | 297/440.1 |
| 7,213,885 B2 * | 5/2007 | White, III | ............... | A47C 13/005 |
| | | | | 297/440.1 |
| 7,387,344 B2 * | 6/2008 | Yu | ............... | A47C 3/00 |
| | | | | 297/440.1 |
| 7,547,073 B2 | 6/2009 | White, III et al. | | |
| 7,806,474 B2 * | 10/2010 | Wahl | ............... | A47C 13/005 |
| | | | | 297/248 |
| 8,777,319 B2 * | 7/2014 | Brandtner | ............... | A47C 4/02 |
| | | | | 297/440.15 |
| 9,277,826 B2 | 3/2016 | Nelson et al. | | |
| 9,474,381 B2 | 10/2016 | Brandtner et al. | | |
| 10,349,750 B2 | 7/2019 | Porter | | |
| 2005/0006943 A1 * | 1/2005 | Wieland | ............... | A47C 4/03 |
| | | | | 297/440.13 |
| 2009/0235451 A1 * | 9/2009 | Gorkin | ............... | A47C 4/022 |
| | | | | 297/440.14 X |
| 2011/0233976 A1 | 9/2011 | Hanson et al. | | |
| 2014/0139000 A1 * | 5/2014 | Ogg | ............... | A47C 7/546 |
| | | | | 297/440.1 X |
| 2016/0262542 A1 * | 9/2016 | Chung | ............... | A47C 4/028 |
| 2017/0071354 A1 * | 3/2017 | Mezzera | ............... | A47C 13/005 |
| 2017/0347799 A1 * | 12/2017 | Sewell | ............... | A47B 95/00 |
| 2021/0068547 A1 * | 3/2021 | Hodgson | ............... | A47C 4/021 |
| 2021/0093087 A1 * | 4/2021 | Zei | ............... | A47C 17/04 |
| 2021/0153658 A1 * | 5/2021 | Kim | ............... | A47C 17/04 |
| 2021/0196049 A1 * | 7/2021 | McCreary | ............... | A47C 17/04 |
| 2021/0251387 A1 * | 8/2021 | Milberg | ............... | A47C 4/028 |

* cited by examiner

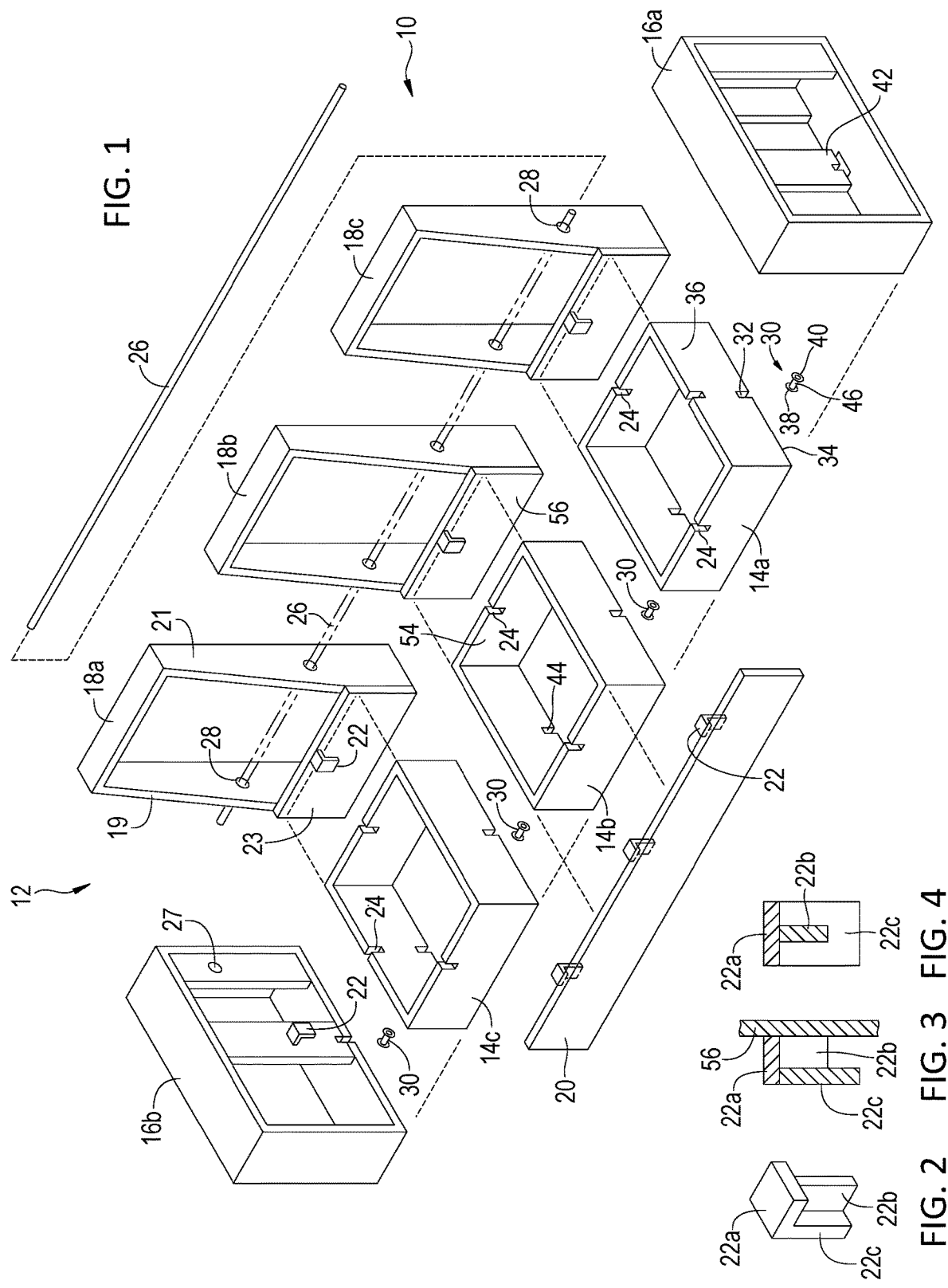

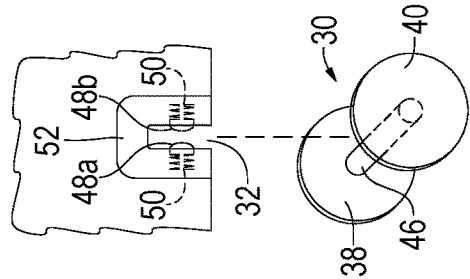
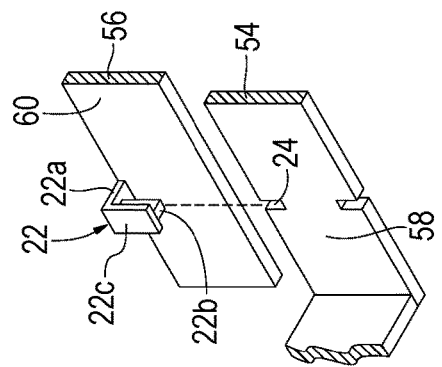
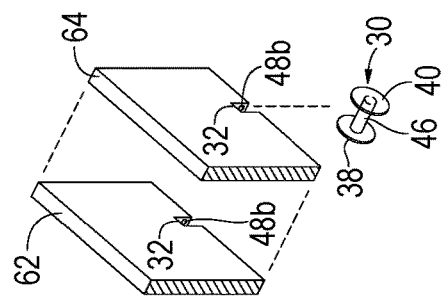
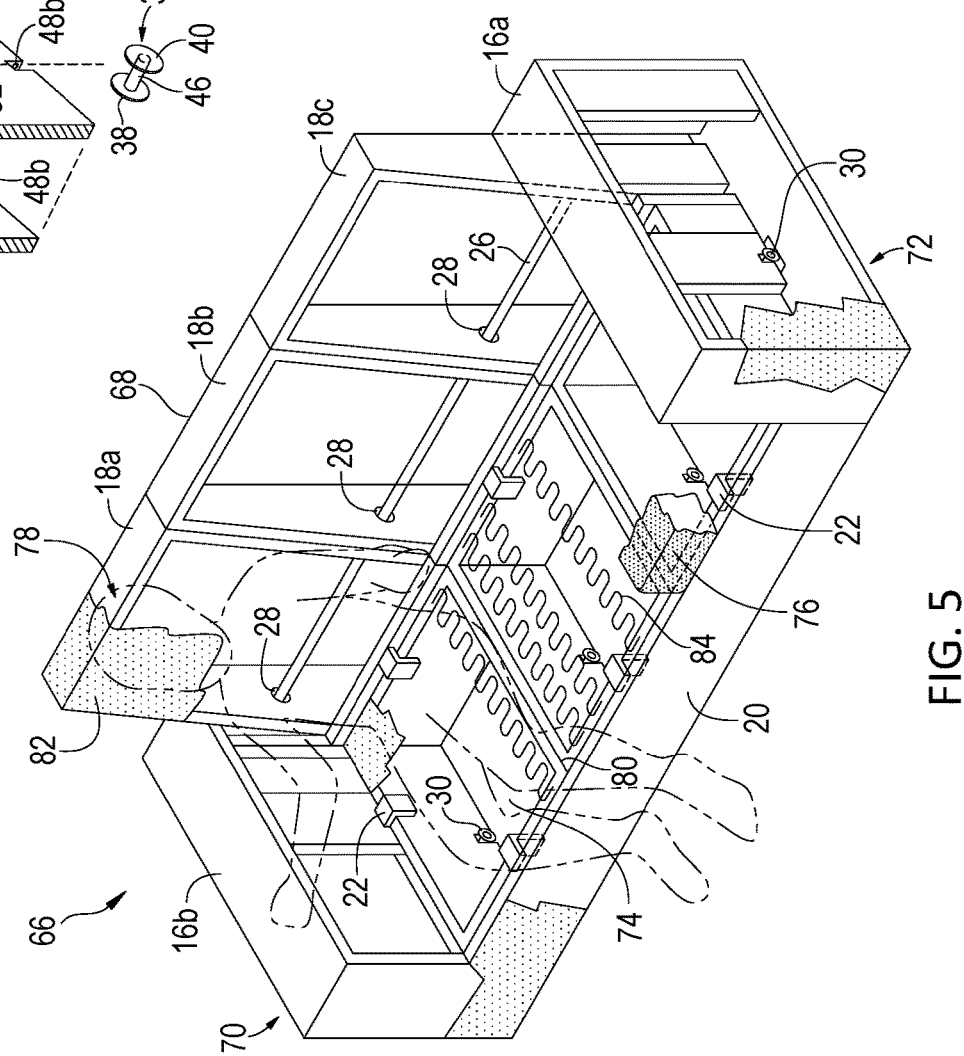

SYSTEM FOR JOINING COMPONENTS OF MODULAR FURNITURE

BACKGROUND OF THE INVENTION

Field of the Invention

The present invention relates generally to furniture, and more particularly, is concerned with a system for joining abutting components of a modular furniture assembly.

Description of the Related Art

Devices relevant to the present invention have been described in the related art; however, none of the related art devices disclose the unique features of the present invention.

In U.S. Pat. No. 7,547,073 dated Jun. 16, 2009, White, I I I, et al., disclosed a modular furniture assembly. In U.S. Pat. No. 9,277,826 dated Mar. 8, 2016, Nelson, et al., disclosed a mounting platform for a modular furniture assembly. In U.S. Pat. No. 10,349,750 dated Jul. 16, 2019, Porter disclosed furniture objects for storing foldable beds. In U.S. Pat. No. 9,474,381 dated Oct. 25, 2016, Brandtner, et al., disclosed a furniture assembly system. In U.S. Patent Application Publication No. 2011/0233976 dated Sep. 29, 2011, Hanson, et al., disclosed modular furniture.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a system for joining the individual pieces of modular furniture together which includes a plurality of fastening devices that align and strengthen the frame of the furniture by tightly joining abutting pieces of the modular furniture assembly together. Also included is an elongated bar which passes through the individual pieces of the back boxes forming the back of the furniture so as to align and strengthen the abutting pieces of the back boxes of the modular furniture assembly. Additionally, a plurality of spool-like devices are placed at strategic locations on the lower edges of the frame of abutting pieces of the modular furniture assembly so as to strengthen and align the frame pieces on their bottom edges.

An object of the present invention is to provide a superior method for aligning and strengthening the individual abutting pieces of a modular furniture assembly. A further object of the present invention is to provide a system of aligning and strengthening the frame of the furniture which is easy for an operator to use. A further object of the present invention is to provide a system of aligning and strengthening the frame of the individual pieces of the modular furniture system which can be relatively easily and inexpensively manufactured. A further object of the present invention is to provide a system of aligning and strengthening the abutting pieces of the modular furniture assembly which lend itself to mass production techniques.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is an exploded perspective view of the individual pieces of a modular furniture assembly illustrating the present invention.

FIG. 2 is a perspective view a fastener of the present invention

FIG. 3 is a cross sectional view of the fastener of the present invention.

FIG. 4 is a cross sectional view of the fastener of the present invention.

FIG. 5 is a perspective view of an assembled view of the modular furniture assembly showing the present invention in operative connection.

FIG. 6 is an enlarged exploded perspective view of portions of the present invention.

FIG. 7 is an enlarged exploded perspective view of portions of the present invention.

FIG. 8 is an enlarged exploded perspective view of portions of the present invention.

LIST OF REFERENCE NUMERALS

With regard to reference numerals used, the following numbering is used throughout the drawings.

10 present invention
12 modular furniture assembly
14a seat box
14b seat box
14c seat box
16a end box for left arm
16b end box for right arm
18a rear back box
18b rear back box
18c rear back box
19 right frame member
20 front board
21 left frame member
22 fastener
22a top flange portion
22b rib portion
22c distal flange portion
23 front frame member
24 receptacle slot for fastener
26 elongated bar
27 aperture
28 aperture
30 spool
32 receptacle slot
34 bottom edge of frame of abutting furniture member
36 side frame member
38 left flange of spool
40 right flange of spool 42 outer edge of abutting furniture member
44 inner edge of abutting furniture member
46 barrel
48a spring loaded button
48b spring loaded button
50 spring
52 U-shaped member
54 first piece of frame
56 second piece of frame
58 inner surface of first piece of frame
60 rear surface of second piece of frame
62 first abutting frame piece
64 second abutting frame piece
66 sofa
68 back portion
70 first end arm portion
72 second end arm portion
74 seating area
76 cushion
78 user
80 abutting joint
82 upholstery cover
84 box spring

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 8 illustrate the present invention wherein a system for joining abutting pieces of a modular furniture assembly is disclosed and which is generally indicated by reference number 10.

Turning to FIG. 1, therein is shown the present invention 10 showing generally at 12 an assembly of various components of a modular furniture assembly which includes a box seat 14a, 14b and 14c having on left and right ends, an end box 16a, 16b for providing a left and right arm rest, along with a plurality of back boxes 18a, 18b and 18c for providing a back portion. Also included is a front board 20 which is disposed across the front of the seat boxes 14a-14c so as to give the assembled piece of furniture a conventional look. Front board 20 is a one-piece construction and strengthens and improves the appearance across the front of the modular furniture assembly 12. Also shown is a plurality of fastening devices 22 which cooperate with corresponding and complimentarily sized receiving slots 24 on the upper edges of the seat boxes 14a-14c of the modular pieces of furniture so that the abutting pieces of the modular furniture assembly 12 can be joined together so that they are aligned and strengthened by the interconnecting fasteners 22 and receiving slots 24. It can be seen that fasteners 22 are disposed on each piece of the abutting furniture assembly 12 so that the individual pieces are firmly and securely joined together. Also shown is an elongated rod 26 which is passed through the back box pieces 18a-18c of the modular furniture assembly 12 by being passed through a series of apertures 28 which are placed in each of the pieces of the back boxes 18a-18c so as to further align and strengthen the individual members of the boxes forming the back portions of the modular frame assembly. Each of the back boxes 18a-18c has a right and left upright frame member 19, 21 through which the apertures 28 are placed along with a front frame member 23 upon which a fastener 22 is disposed. Each end of rod 26 is inserted into a corresponding mating aperture 27 of end boxes 16a-16b so that the back boxes 18a-18c are also joined to the end boxes 16a-16b using bar 26. Also shown is the spool-like member 30 which cooperates with a receiving slot 32 in the bottom edge of the seat boxes and end boxes wherein the spool 30 works in cooperation with a receiving slot 32 disposed on a lower side edge 34 of a frame member 36 of the individual components of the modular furniture assembly 12 by having the left and right spool flange portion 38, 40 enclose the outer and inner surfaces 42, 44 of the receptacle slot 32 so that when barrel 46 of a spool 30 is disposed in the receptacle slots 32 the adjoining or abutting pieces of the furniture assembly 12 are tightly held together.

Turning to FIGS. 2-4, therein are shown enlarged views of an individual fastener 22. Turning to FIG. 3, therein is shown an individual fastener 22 attached to an exemplary piece of frame member 56, for example, front frame member 23 of rear back box 18b. The fastener 22 has a rib 22b extending away from the frame member 56 a distance slightly greater than the thickness of the adjacent abutting frame member 54 (as shown in FIG. 8) so as to pass into and through the corresponding receptacle slot 24. Fastener 22 also has a distal end having a retention flange 22c attached thereon so that when the retention flange is placed through the receptacle slot 24 the retention flange has a surface thereon which lies contiguous to a corresponding surface of the receptacle slot 24 so that the first frame member 54 is securely attached to the second frame member 56. Fastener 22 also has a top flange portion 22a which rests on an upper edge of a frame member 54 to cause the two pieces of frame members 54, 56 to be in a user selected spatial relationship so that the abutting pieces 54, 56 of the modular furniture assembly 12 are properly aligned and strengthened. FIGS. 2 and 4 show other views of the fastener 22 showing the previously disclosed elements.

Turning to FIG. 5, therein is shown an assembled view illustrating the present invention 10 in use on a sofa 66 being conventional in nature having a back portion 68 and first and second end arm portions 70, 72 and providing a general seating area 74 wherein the seating area is provided with cushions 76 extending across its upper portion for use by a user 78. FIG. 5 is drawn so that the cushions 76 are removed for sake of clarity; of course, in normal practice all the cushions 76 would be in place positioned side-to-side across the sofa 66 so that the present invention 10 would be supporting the cushions from underneath the cushions. The sofa 66 is comprised of the seat boxes 14a-14c, back boxes 18a-18c, and also includes the end boxes 16a-16b. An exemplary abutting seam or joint 80 is shown but joints would be formed between all of the abutting pieces of the sofa 66 along with portions of the upholstery cover 82 and box spring 84. Also shown are the previously disclosed elements.

Turning to FIGS. 6 and 7, therein is shown the spool 30 having a left and right flange portion 38, 40 along with barrel 46 which is inserted from the bottom into a receptacle slot 32 of abutting pieces of the modular furniture assembly so that the barrel 46 is pushed up all the way into the receptacle slot 32 and held in place by spring-loaded buttons 48a, 48b which buttons are biased toward each other using corresponding springs 50 (see FIG. 7) and are built into a downwardly disposed U-shaped bracket 52 which is inserted and built into the lower edge 34 of the abutting pieces of frame members 62, 64. Turning more particularly to FIG. 7, therein is shown the spool 30 having left and right flange portions 38, 40 along with barrel 46 which is inserted from the bottom into a slot 32 of abutting pieces of the modular furniture assembly as previously disclosed so that the barrel 46 is inserted into and pushed up completely into the receptacle slot 32 and held in place by U-shaped bracket 52 including spring-loaded buttons 48a, 48b which buttons are biased toward each other using corresponding springs 50 and are held into the downwardly disposed U-shaped bracket 52 which is inserted and built into the lower edge 34 of the abutting pieces of frame members 62, 64. The abutting pieces of frame members 62, 64 are tightly held between the flange portions 38, 40.

Turning to FIG. 8, therein is shown abutting pieces 54, 56 of the components of a modular furniture assembly 12 showing the fastener bracket 22 exploded away from the receiving slot 24 so that the rib portion 22b of the fastener 22 can be inserted into the slot 24 so that the distal flange portion 22c of the fastener 22 is held contiguously against the inner surface 58 of the adjoining piece having the receptacle 24 disposed therein so that the pieces 54, 56 are aligned and strengthened. Surface 60 of the second piece of frame 56 is also shown.

Left and right side designations regarding the present invention 10 are interpreted from the view of one seated in the sofa 66 of FIG. 5 and facing forwardly, i.e., away from the back 68.

By way of summary and with reference to FIGS. 1-8, the present invention 10 discloses a system for joining individual pieces of a modular furniture assembly 12 together including: a) assembling a row of side by side rectangular seat boxes 14a-14c, each seat box comprising upright front and rear walls, and an oppositely arranged pair of upright side walls, wherein side walls of adjacent seat boxes abut each other; b) placing first and second rectangular end boxes 16a-16b adjacent end boxes of the row of seat boxes, each end box comprising a top horizontal wall and a bottom horizontal wall, a pair of front and rear upright walls engaged with front and rear edges of the top and bottom horizontal walls, respectively, and each end box having a vertical member facing and abutting an adjacent seat box; c) providing a row of rectangular back boxes 18a-18c, each back box comprising a pair of vertically extending side walls 19, 21 and a horizontal top wall joining top edges of the vertically extending side walls, and a front wall 23 extending between lower portions of the side walls and abutting rear walls of corresponding seat boxes, wherein the row of rectangular back boxes form a back portion 68 of the modular furniture assembly; d) mounting a front board 20 along the front walls of the seat boxes between the first and second end rectangular boxes; e) extending means 26 through the side walls of the back boxes for aligning and strengthening the back boxes; f) providing a plurality of first fastener assemblies 30 for attaching adjacent seat boxes to each other, and side walls of end seat boxes to adjacent end boxes; and g) providing a plurality of second fastener assemblies 22, 24 for attaching the first and second end boxes to adjacent seat boxes, for attaching the rear back boxes to respective seat boxes, and for attaching the front board to the front walls of the seat boxes. Also shown are means extending through side walls of the back boxes comprises an elongated bar extending through apertures 28 in the side walls of the back boxes, and, in which each of the first fastener assemblies comprises a first receptacle slot 32 along a bottom edge of each side wall in a seat box, and a spool 30 fitted into slots of adjacent side walls of adjacent seat boxes for tightly holding adjacent seat boxes together, and, in which each first receptacle slot is provided with spring loaded buttons 48a, 48b for securing the spools, and, in which each of the second fastener assemblies comprises a plurality of second receptacle slots 24 disposed along a top edge of front and rear walls of the seat boxes and side walls of end seat boxes adjacent the end boxes, and having a plurality of L-shaped fasteners 22 disposed on the walls of the end boxes, back boxes, and the front board for overlapping and engaging each second receptacle slot for aligning and strengthening an assembly of the individual pieces of the modular furniture assembly, and, in which each L-shaped fastener has a distal flange portion 22c for overlapping the second receptacle slot and a rib portion 22b extending into the second receptacle slot, and in which the seat boxes have top openings, and deploying box springs 84 over the top openings, and, in which the modular furniture comprises a sofa 66, and, in which the sofa has cushions 76 on the box springs, and, in which the modular furniture assembly is upholstered 82.

I claim:

1. A system for joining individual pieces of a modular furniture assembly, comprising:
   a) a row of side by side rectangular seat boxes, each seat box comprising upright front and rear walls, and an oppositely arranged pair of upright side walls, side walls of adjacent seat boxes abutting each other;
   b) first and second rectangular end boxes, each and box comprising a top horizontal wall and a bottom horizontal wall, a pair of front and rear upright walls engaged with front and rear edges of said top and bottom horizontal walls, respectively, and each end box having a vertical member facing and abutting an adjacent seat box;
   c) a row of rectangular back boxes, each back box positioned behind a seat box, each back box comprising a pair of vertically extending side walls and a horizontal top wall joining top edges of said vertically extending side walls, and a front wall extending between lower portions of said side walls and abutting rear walls of corresponding seat boxes, wherein said row of rectangular back boxes form a back portion of the modular furniture assembly;
   d) a front board extending along said front walls of said seat boxes between said first and second end rectangular boxes;
   e) means extending through said side walls of said back boxes for aligning and strengthening said back boxes;
   f) a plurality of first fastener assemblies for attaching adjacent seat boxes to each other, and side walls of said end seat boxes to adjacent end boxes; and
   g) a plurality of second fastener assemblies for attaching said first and second end boxes to adjacent seat boxes, for attaching said rear back boxes to respective seat boxes, and for attaching said front board to said front walls of said seat boxes, each of said second fastener assemblies comprising a plurality of receptacle slots disposed along a top edge of front and rear walls of said seat boxes and side walls of end seat boxes adjacent said end boxes, and having a plurality of L-shaped fasteners disposed on the walls of said end boxes, back boxes, and said front board for overlapping and each L-shaped fastener having a rib portion engaging each said second receptacle slot for aligning and strengthening an assembly of said individual pieces of the modular furniture assembly.

2. The system of claim 1, in which said means extending through side walls of said back boxes comprises an elongated bar extending through apertures in said side walls of said back boxes.

3. A method for joining individual pieces of modular furniture, comprising the steps of:
   a) assembling a row of side by side rectangular seat boxes, each seat box comprising upright front and rear walls, and an oppositely arranged pair of upright side walls, wherein side walls of adjacent seat boxes abut each other;
   b) placing first and second rectangular end boxes adjacent end boxes of the row of seat boxes, each end box comprising a top horizontal wall and a bottom horizontal wall, a pair of front and rear upright walls engaged with front and rear edges of the top and bottom horizontal walls, respectively, and each end box having a vertical member facing and abutting an adjacent seat box;
   c) providing a row of rectangular back boxes, each back box comprising a pair of vertically extending side walls and a horizontal top wall joining top edges of the vertically extending side walls, and a front wall extending between lower portions of the side walls and abutting rear walls of corresponding seat boxes, wherein the row of rectangular back boxes form a back portion of the modular furniture assembly;
   d) mounting a front board along the front walls of the seat boxes between the first and second end rectangular boxes;
   e) extending means through the side walls of the back boxes for aligning and strengthening the back boxes;
   f) providing a plurality of first fastener assemblies for attaching adjacent seat boxes to each other, and side walls of end seat boxes to adjacent end boxes; and
   g) providing a plurality of second fastener assemblies for attaching the first and second end boxes to adjacent seat boxes, for attaching the rear back boxes to respective seat boxes, and for attaching the front board to the front walls of the seat, each of said second fastener assemblies comprising a plurality of receptacle slots disposed along a top edge of front and rear walls of said seat boxes and side walls of end seat boxes adjacent said end boxes, and having a plurality of L-shaped fasteners disposed on the walls of said and boxes, back boxes, and said front board for overlapping and each each L-shaped fastener having a rib portion engaging each said second receptacle slot for aligning and strengthening an assembly of said individual pieces of the modular furniture assembly.

4. The method of claim 3, in which the means extending through side walls of the back boxes comprises an elongated bar extending through apertures in the side walls of the back boxes.

5. A system for joining individual pieces of a modular furniture assembly, comprising:
   a) a row of side by side rectangular seat boxes, each seat box comprising upright front and rear walls, and an oppositely arranged pair of upright side walls, side walls of adjacent seat boxes abutting each other;
   b) first and second rectangular end boxes, each end box comprising a top horizontal wall and a bottom horizontal wall, a pair of front and rear upright walls engaged with front and rear edges of said top and bottom horizontal walls, respectively, and each end box having a vertical member facing and abutting an adjacent seat box;
   c) a row of rectangular back boxes, each back box positioned behind a seat box, each back box comprising a pair of vertically extending side walls and a horizontal top wall joining top edges of said vertically extending side walls, and a front wall extending between lower portions of said side walls and abutting rear walls of corresponding seat boxes, wherein said row of rectangular back boxes form a back portion of the modular furniture assembly;
   d) a front board extending along said front walls of said seat boxes between said first and second and rectangular boxes;
   e) means extending through said side walls of said back boxes for aligning and strengthening said back boxes;
   f) a plurality of first fastener assemblies for attaching adjacent seat boxes to each other, and side walls of said end boxes to adjacent end boxes;
   g) a plurality of second fastener assemblies for attaching said first and second and boxes to adjacent seat boxes, for attaching said rear back boxes to respective seat boxes, and for attaching said front board to said front walls of said seat boxes; and
   h) each of said first fastener assemblies comprising a first receptacle slot along a bottom edge of each side wall in a seat box, and a spool fitted into slots of adjacent side walls of adjacent seat boxes for tightly holding adjacent seat boxes together.

6. The system of claim 5, in which each said first receptacle slot is provided with spring loaded buttons for securing said spools.

7. The system of claim 5, in which each of said second fastener assemblies comprises a plurality of second receptacle slots disposed along a top edge of front and raw walls of said seat boxes and side walls of end seat boxes adjacent said and boxes, and having a plurality of L-shaped fasteners disposed on the walls of said end boxes, back boxes, and said front board for overlapping and engaging each maid second receptacle slot for aligning and strengthening an assembly of said individual pieces of the modular furniture assembly.

8. The system of claim 7, in which each said L-shaped fastener has a distal flange portion for overlapping said second receptacle slot and a rib portion extending into said second receptacle slot.

9. The system of claim 8, in which said seat boxes have top openings on which are deployed box springs.

10. The system of claim 9, in which said modular furniture comprises a sofa.

11. The system of claim 10, in which said sofa has cushions on said box springs.

12. The system of claim 11, in which the modular furniture assembly is upholstered.

13. A method for joining individual pieces of modular furniture, comprising the steps of:
   a) assembling a row of side by side rectangular seat boxes, each seat box comprising upright front and roar walls, and an oppositely arranged pair of upright side walls, wherein side walls of adjacent seat boxes abut each other,
   b) placing first and second rectangular end boxes adjacent end boxes of the row of seat boxes, each end box comprising a top horizontal wall and a bottom horizontal wall, a pair of front and rear upright walls engaged with front and rear edges of the top and bottom horizontal walls, respectively, and each end box having a vertical member facing and abutting an adjacent seat box;

c) providing a row of rectangular back boxes, each back box comprising a pair of vertically extending side walls and a horizontal top wall joining top edges of the vertically extending side walls, and a front wall extending between lower portions of the side walls and abutting rear walls of corresponding seat boxes, wherein the row of rectangular back boxes form a back portion of the modular furniture assembly;

d) mounting a front board along the front walls of the seat boxes between the first and second end rectangular boxes;

e) extending means through the side walls of the back boxes for aligning and strengthening the back boxes;

f) providing a plurality of first fastener assemblies for attaching adjacent seat boxes to each other, and side walls of end boxes to adjacent end boxes;

g) providing a plurality of second faster assemblies for attaching the first and second end boxes to adjacent seat boxes, for attaching the rear back boxes to respective seat boxes, and for attaching the front board to the front walls of the seat boxes; and h) each of the first fastener assemblies comprising a first receptacle slot along a bottom edge of each side wall in a seat box, and a spool fitted into slots of adjacent side walls of adjacent seat boxes for tightly holding adjacent seat boxes together.

14. The method of claim 13, in which each first receptacle slot is provided with spring loaded buttons for securing the spools.

15. The method of claim 13, in which in which each of the second fastener assemblies comprises a plurality of second receptacle slots disposed along a top edge of front and rear walls of the seat boxes and side walls of and seat boxes adjacent the end boxes, and having a plurality of L-shaped fasteners disposed on the walls of the end boxes, back boxes, and the front board for overlapping and engaging each second receptacle slot for aligning and strengthening an assembly of the individual pieces of the modular furniture assembly.

16. Ile method of claim 15, in which each L-shaped fastener has a distal flange portion for overlapping the second receptacle slot and a rib portion extending into the second receptacle slot.

17. The method of claim 16, in which the seat boxes have top openings, and deploying box springs over the top openings.

18. The method of claim 17, in which the modular furniture comprises a sofa.

19. The method of claim 13, in which the sofa has cushions on the box springs.

20. The method of claim 19, in which the modular furniture assembly is upholstered.

\* \* \* \* \*